United States Patent [19]
Malloy et al.

[11] 3,781,775
[45] Dec. 25, 1973

[54] ROTATING STEREO SONAR MAPPING AND POSITIONING SYSTEM

[75] Inventors: Richard J. Malloy, Ojai; Robert D. Hitchcock, Ventura, both of Calif.

[73] Assignee: The United States of America as represented by the Secretary of the Navy, Washington, D.C.

[22] Filed: May 1, 1972

[21] Appl. No.: 249,330

[52] U.S. Cl................ 340/3 R, 340/5 MP, 340/8 S
[51] Int. Cl................................................. G01s 9/66
[58] Field of Search..................... 340/3 R, 3 F, 5 R, 340/5 MP, 8 R, 8 S

[56] References Cited
UNITED STATES PATENTS
3,161,255   12/1964   Balise, Jr................ 340/8 S

*Primary Examiner*—Richard A. Farley
*Attorney*—Richard S. Sciascia, Q. B. Warner and J. M. St. Amand

[57] ABSTRACT

A stereo sonar system comprising a pair of pulsed sonar transducers mounted one above the other on a stationary bottom frame. The transducers are rotated as a unit but are spaced sufficiently to produce a three dimensional figure when stereo viewed.

4 Claims, 3 Drawing Figures

PATENTED DEC 25 1973

3,781,775

ROTATING STEREO SONAR MAPPING AND POSITIONING SYSTEM

BACKGROUND OF THE INVENTION

1. Field of the Invention.

This invention relates to devices for mapping the seafloor and for precisely positioning specific objects on the seafloor. It is more particularly adapted to the use of stereo sonar imagery to achieve such seafloor mapping.

2. Description of the Prior Art.

Heretofore, various state of the art methods of obtaining a relatively accurate map of the seafloor have been proposed and include: (1) multibeam sonar with transducers attached to hull of surface vessel; (2) side-looking sonar with transducers attached to towed platform flying at a short distance above bottom; and (3) photogrammetric camera or stero camera-pair attached to a low-flying manned submersible. Relatively small bottom areas of about 200 feet by 200 feet are most cost-effectively mapped by the towed-fish side-sonar method. A major problem is the measurement of true $xyz$ coordinates of bottom points relative to a bottom benchmark.

At least two techniques are presently being used to measure $xyz$ coordinates of seafloor points from side-scan sonar records. One method uses a pair of stacked transducers operated simultaneously and connected to the receiving electronics so that the difference in the signals from the two transducers is recorded in time. This constitutes an interferometer system. The other technique uses two separate side-sonar records obtained with a single transducer; the records are generated by scanning the bottom area twice from two different off-bottom heights. Both techniques require considerable on-shore processing of data to construct a contour map of the scanned seafloor area.

A major difficulty in measuring $xyz$ coordinates of bottom points, using a towed side-scan system, is determining the position of the towed system relative to a bottom benchmark. This is done by using a long-baseline transponder network, which consists of three or more bottom units, each requiring a self-contained power supply and complex electronic circuitry. Baseline engths are measured by a surveying-in operation which requires about a day of data taking and, if one-board computer facilities are lacking, another day to process the data.

State-of-the-art methods of implanting objects on the seafloor at precisely determined points also utilize transponder system, either the long baseline or short baseline types. In either type of transponder system, one or more bottom units are required, again each unit having a self-contained power supply and complex electronics. Echo ranging methods of positioning objects on the ocean floor uses a single 360° scanning transducer which does not measure true elevation and lateral distance of position.

SUMMARY OF THE INVENTION

Briefly, the present invention includes a pair of pulsed sonar transducers which are mounted one above the other on a stationary mounting frame positioned on the ocean floor. The pair of transducers are rotated as a single unit but are spaced sufficiently to produce a three dimensional figure when viewed stereoptically.

Because this invention has the scanning transducers mounted rigidly together on the same support structure, the problems associated with separately towed sonar transducers will be eliminated. Techniques of obtaining radar stereo imagery utilize a pair of radargrams obtained from a single radar transducer flown along separated flight paths, these flight paths are parallel and are oriented relative to each other so as to maximize the stereo effect. If the target area is scanned from opposite side, maximum parallax is obtained; however, the left eye may not recognize a scanned object as the same one seen with the right eye because of distortion. Such distortion is found in radar imagery as well as sonar imagery because radar also measures distance in the same way that sonar measures distance. Hence, in radar stereo it has been found that same side scanning produces better stereo imagery than opposite side scanning. The invention described in this disclosure has the advantage of same side scanning because the transducers are mounted one above the other on a vertical axis.

Therfore, an object of this invention is to provide a device adapted to generate a pair of sonar records in one operation, which records can be used to produce a three-dimensional picture.

Another object of the invention is to provide a device capable of measuring true $xyz$ coordinates of natural ocean bottom features.

Other objects, advantages and novel features of the invention will become apparent from the following detailed description of the invention when considered in conjunction with the accompanying drawings. wherein

DESCRIPTION OF THE PREFERRED EMBODIMENT

Figure 1:
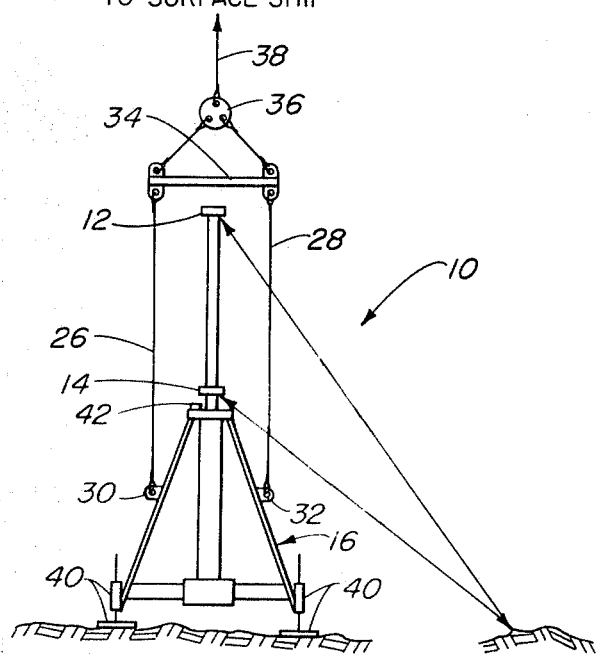
FIG. 1 is schematic view of the present stereo sonar system during a scanning operation.

Referring to the drawings wherein like numbers refer to like parts it is seen that the invention is a stereo sonar system 10 including a pair of fan-beam pulsed sonar transducers 12 and 14 mounted one above the other in the same axis on element 44 which is part of a conventional stationary bottom support frame 16 best shown in FIG. 1. The latter possessing adjustable feet 40 in order to level the system 10 in the event of uneven aqueous terrain. The pair of transducers 12 and 14 is conventionally rotated as a single unit by motor 42 actuated via a signal sent from the surface ship. The vertical separation of the transducers 12 and 14 is large enough to produce a pair of sonar records which will blend together in a stereo-viewing system to present a three dimensional picture of a circular area of the ocean floor.

The entire system 10 is lowered to the ocean floor from a surface ship through a series of cables notably 26 and 28 attached to support structure 16 at 30 and 32 respectively. The cables are maintained in parallel position by separator bar 34 above which the cables are joined by ring 36 to the surface ship cable 38.

Figure 2:
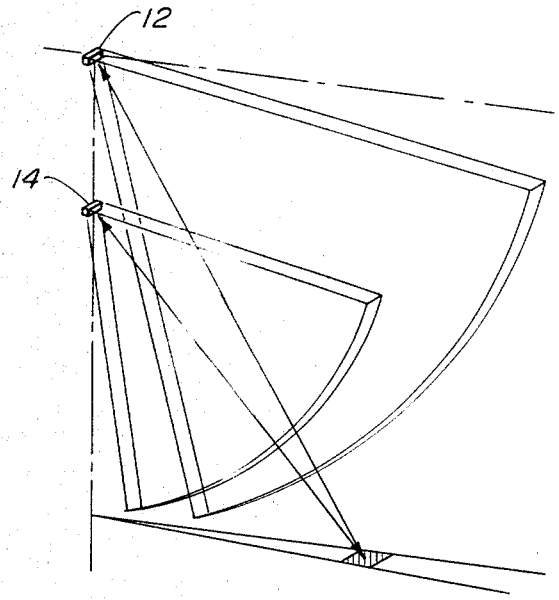
FIG. 2 is a view of the transducers and illustrates the beam geometry for near-field operation.

As an example of a specific operational scheme, sonar parameters are chosen so that the scanned circular area is within the near field of each transducer, so that the beam shape is a wedge having constant width equal to the transducer length, as shown in FIG. 2. For a scanned area of 100 foot radius, a suitable transducer length, L is 1.5 ft. (FIG. 1). If the sound frequency is 300 kHz, a representative value for high-resolution side-looking sonar systems, then the range, $r_o$, of the near field is around 135 feet, as computed from the relation:

$$r_o = L^2/\lambda$$

where $\lambda$ is wavelength, $1.67 \times 10^{-2}$ ft. With the upper transducer about 33 feet above bottom, the maximum echo range for a 100 feet radium area is under 135 feet.

The elevation beam angle of each transducer is around 60° and the depression angle about 8°, hence a 360° scan with the rotating transducer pair 12 and 14 will cover most of the circular area centered at the axis of the system. A circle of radius about 6 feet will be excluded. Because the transducer pair 12 and 14 is mounted on a rigid, stationary structure 16, the stereo effect will be attained even though the 360°-scanning operation takes a relatively long time, as compared to the time it takes to produce a pair of stereo photographs.

The area to be mapped or to contain emplaced objects, is scanned a sector at a time; the angular width of a sector for the near-field case is roughly equal to the ratio of transducer length to radius of area. The maximum round-trip travel time for a single pulse is around 42 milliseconds for a 100 ft radius circle and transducer height of 33 feet; and the angular width of a sector insonified by a single pulse is approximately 1.1 degrees. Hence, assuming 360 sectors will be isonified in one 360° scan, we see that a single scan will take at least 15 seconds. For coverage of a large circular area, far-field operation would be included and a different set of sonar parameters chosen.

Figure 3:
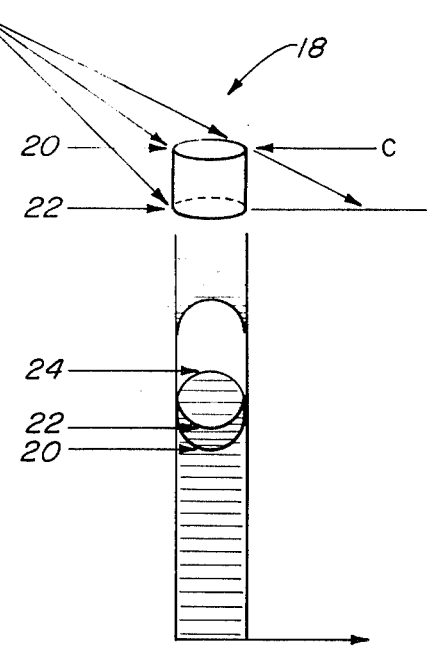
FIG. 3 is a schematic view of sonar imagery of the cylindrical object.

Because sonar detects range, instead of angle (as is done by a photographic system), the sonar image of an object scanned by a fan beam will not have the appearance of the image obtained photographically. This situation is illustrated in FIG. 3 which shows the sonar image 18 of a cylinder. The image 18 is a kind of inside-out cylinder, resulting from the fact that contour 20 (FIG. 3) is nearer to the transducer than contour 22 (FIG. 3); this situation causes the bottom of the cylinder to appear between contours 20 and 24. The three-dimensional picture, obtained from blending the imagery from each sonar transducer in a stereo viewer, will therefore, not be a conventional three-dimensional representation of the bottom area or a set of objects within this area. The important fact is, however, that the picture will be three-dimensional and will make possible the construction of a map with points identified by true $xyz$ coordinates.

Another use of the invention is the positioning of objects relative to an array of seafloor benchmarks. If natural seafloor features are present, such as outcroppings or faults, they can also be used as benchmarks in the positioning operation. Before the objects are employed, a sonar stereo pair of records are obtained of the area where emplacements will be made.

One of the principle features of this invention is the fact that a pair of sonar records is generated in one operation, and these records can be used to produce a three-dimensional picture from which topography can be immediately recognized. In existing methods of mapping by side-looking sonar, a considerable amount of on-shore labor is required to match the two records obtained in separate scanning operations. The matching of corresponding points on two records is absolutely essential in order to compute true $xyz$ coordinates; and using the stereo scanning system will result in the identification of bottom features which would be overlooked in the older method of mapping. With a suitably designed stereo viewing system, the entire measurement process can be conducted aboard ship in a relatively short time.

Another feature of this invention is in its use as a positioning system. Existing systems use transponders or a single 360° echo-ranging sonar device. Such a device cannot measure true $xyz$ coordinates of natural bottom features or previously emplaced emplaced sonar benchmarks. The rotating stereo sonar system has the advantage of yielding true coordinates and, hence, more precise positioning. Also, the stereo system will permit easier recognition of natural bottom features, than existing echo-ranging techniques, and hence will reduce the time required to relocate the seafloor site where the positioning operation is to take place.

Within the present concept for producing a pair of stereo sonar records would be one in which a single fan-beam transducer is operated at two different elevations on the same vertical axis. The two sonar images would produce a three-dimensional picture having a quality equal to that of the simultaneously operated transducer pair; however, because two 360° scan would be required, the time of observation would be approximately doubled. The stereo blending of the records would still be possible by using conventional video-tape methods.

Obviously many modifications and variations of the present invention are possible in the light of the above teachings. It is therefore to be understood that within the scope of the appended claims the invention may be practiced otherwise than as specifically described.

What is claimed is:

1. A stereo sonar system for both accurate mapping of an aqueous floor and positioning of objects on said floor comprising:
   a supporting framework;
   a pair of fan-beam pulsed sonar transducers mounted one above the other in spaced relationship on said framework and;
   means for rotating said transducer as a unit;
   said transducers adapted to be rotated together but being sufficiently spaced to produce a pair of sonar records in one operation which are used to produce a three-dimensional figure when stereo viewed.

2. The stereo sonar system of claim 1 wherein:
   the transducers are mounted in spaced vertical relationship on the same axis.

3. The stereo sonar system of claim 2 wherein:
   said supporting framework is adjustable to provide leveling action in the event the aqueous floor is uneven.

4. A stereo sonar system for both accurate mapping of an underwater floor and positioning of objects on said floor comprising:
   a supporting framework;
   a single fan-beam pulsed sonar transducer mounted on said framework;
   means for rotating said transducer;
   said single transducer being operated at two different elevations on the same vertical axis while being rotated to obtain records of two different sonar images which are used to produce a three-dimensionsal picture of a circular area of said floor when both images are stereo viewed.

* * * * *